United States Patent [19]  
Kunert

[11] Patent Number: 4,606,159  
[45] Date of Patent: Aug. 19, 1986

[54] GLASS AUTO WINDOW FOR, AND METHOD OF, QUICK INSTALLATION

[75] Inventor: Heinz Kunert, Cologne, Fed. Rep. of Germany

[73] Assignee: Vegla Vereinigte Glaswerke GmbH, Aachen, Fed. Rep. of Germany

[21] Appl. No.: 688,751

[22] Filed: Jan. 4, 1985

[30] Foreign Application Priority Data

Jan. 9, 1984 [DE] Fed. Rep. of Germany ....... 3400428

[51] Int. Cl.[4] ............................................. B65B 11/00
[52] U.S. Cl. ........................................ 52/208; 52/400; 52/770; 52/716; 196/84 D
[58] Field of Search ................. 52/204, 208, 397, 400, 52/489, 98, 509, 764, 768, 770, 579, 584, 712, 713, 714, 213, 716; 296/84 R, 84 A, 84 D, 93

[56] References Cited

U.S. PATENT DOCUMENTS

| | | | |
|---|---|---|---|
| 2,141,039 | 12/1938 | Hamm | 52/400 |
| 3,742,649 | 7/1973 | Dochnahl | 52/397 X |
| 4,245,448 | 1/1981 | Agar | 52/489 |
| 4,304,075 | 12/1981 | Miyashi | 52/98 |
| 4,364,209 | 12/1982 | Gebhard | 52/400 X |

FOREIGN PATENT DOCUMENTS 2613946 10/1977 Fed. Rep. of Germany ........ 52/397

Primary Examiner—Carl D. Friedman  
Assistant Examiner—Naoko N. Slack  
Attorney, Agent, or Firm—Marmorek, Guttman & Rubenstein

[57] ABSTRACT

An auto glass pane (1), intended to be installed directly into an auto is disclosed. The auto glass pane (1) has along its periphery a series of mounting strips (4) made of flexible metal. The mounting strips (4) are arranged at a defined distance from the glass pane edge. The mounting strips (4) are connected, preferably cemented, to the interior side of the glass pane (1) opposite the mounting flange of the auto body's window frame.

After the glass pane is positioned within the window frame, the mounting strips (4) are bent by hand around the mounting flange. The mounting strips (4) serve to lock the glass pane into the desired position until the adhesive substance which is used to affix the auto glass pane (1) to the auto body's window frame completely hardens.

10 Claims, 7 Drawing Figures

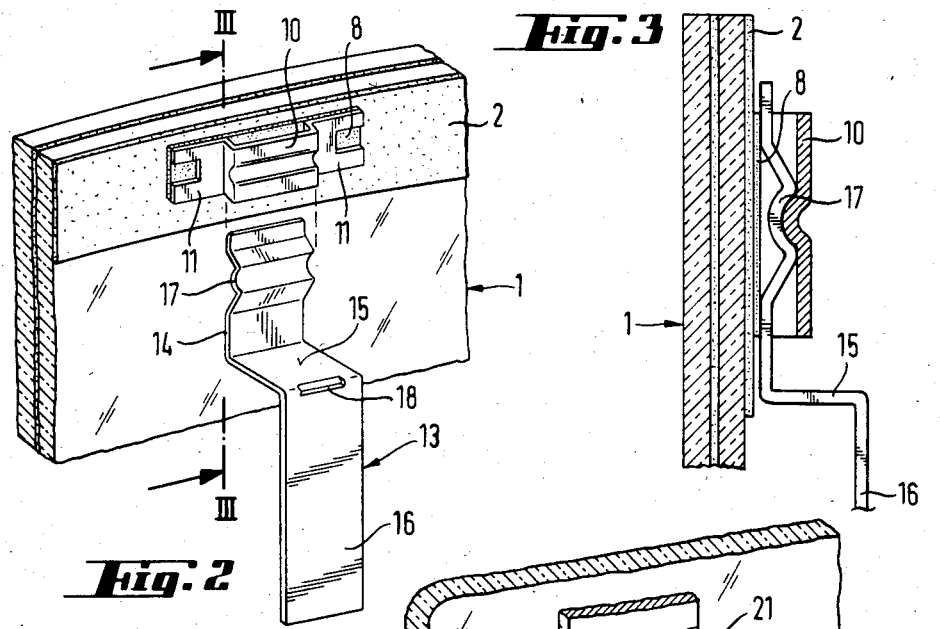
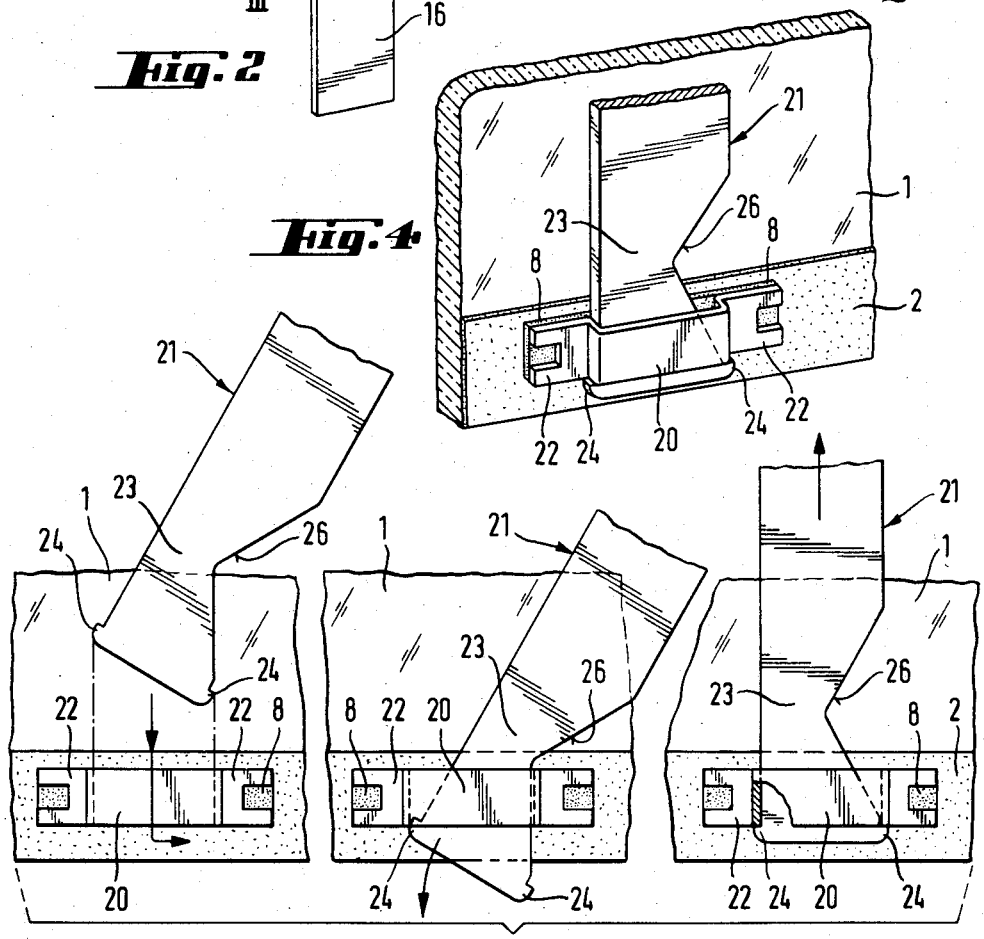

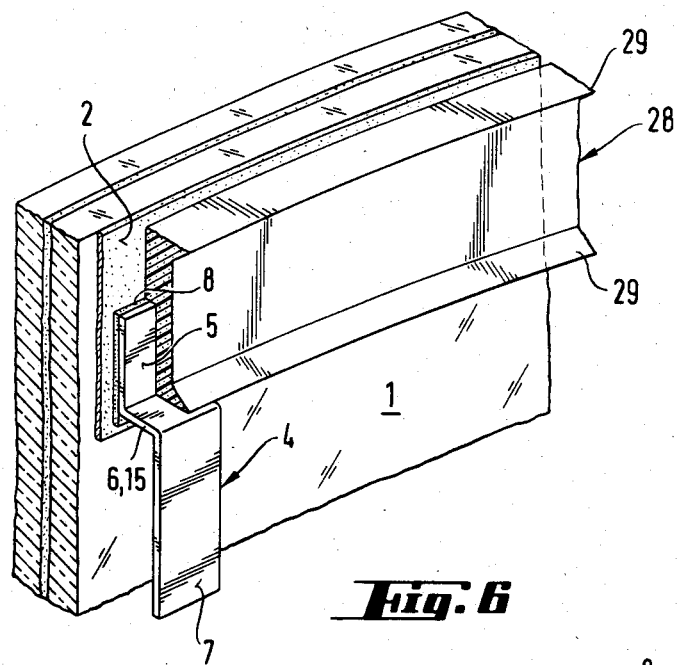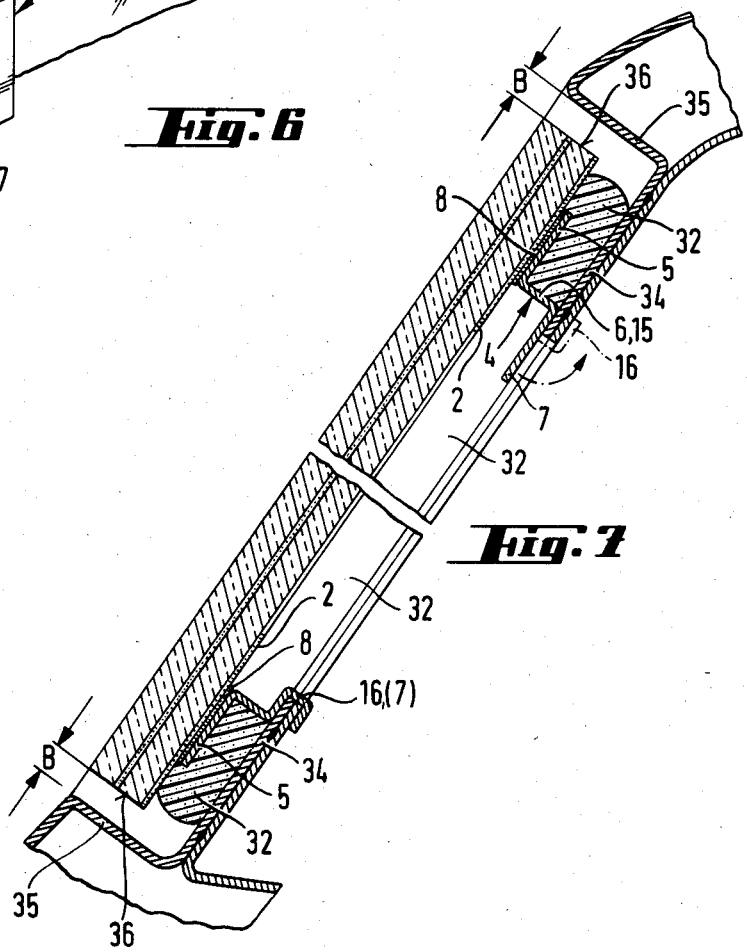

GLASS AUTO WINDOW FOR, AND METHOD OF, QUICK INSTALLATION

BACKGROUND OF THE INVENTION

The invention relates to an auto glass pane which is installed directly into a window frame by means of a hardening adhesive substance. The glass pane includes mechanical auxiliary means for positioning the glass pane within the window frame and for retaining the glass pane in its final position until the hardening of the adhesive substances is completed. The invention furthermore relates to a method for inserting the glass pane into the window opening of a motor vehicle body.

In the case of the so-called direct pane installment in the window opening of an auto body, the installation of the glass pane, for example of the windshield pane or of the rear-wall pane, takes place through direct cementation. With the aid of an extrusion nozzle, a strip of adhesive material is applied onto the peripheral area of the glass pane and the glass pane is inserted directly into the window frame of the auto body. The adhesive strip, which is still soft, comes to lie along the entire pane periphery opposite the mounting flange of the window frame and when it hardens, it tightly cements the glass pane directly to the mounting flange.

In the case of direct pane installment, the glass panes have to be accurately positioned within the window frame, so that the gap between the edge of the pane and the window frame groove is uniform along the entire periphery of the glass pane.

However, as long as the strip of adhesive has not yet hardened but can still be plastically deformed, the inserted glass pane does not remain in its initial position within the window frames. Under the influence of its own weight, it has a tendency to sink downward. In order to prevent this, and in order to retain the glass pane in the desired position, particularly in the vertical sense, spacer blocks are inserted between the lower window frame groove and the lower edge of the glass pane. These spacer blocks can be constructed in a wedge-shaped manner, so that the desired gap width can be adjusted by a more or less deep insertion of the wedge. In place of such spacer blocks, which are removed after the adhesive material hardens, one may utilize vertically adjustable range spacers which are rigidly arranged on the frame groove, for example in the form of eccentrically mounted discs, which, if necessary, remain in the window frame groove after the hardening of the adhesive substance.

In the case of form-locked insertion of auto glass panes, in the course of which the glass pane surfaces and the adjacent auto body parts are to blend into one another in a flush manner, owing to the required streamlined form, an additional problem manifests itself due to the fact that the glass panes, which had been bent in the usual manner, display bending tolerances. In order to achieve a flush state, the glass pane, after it has been positioned in the window frame, has to be pressed along its periphery against the mounting flange of the window frame. If necessary, the bending deviations have to be compensated for through these pressing forces. These pressing forces must be applied until the adhesive substance hardens to such an extent, that the cohesive forces of the adhesive substance are of a sufficient order of magnitude to prevent a return of the elastically deformable glass pane to its previous state.

The known and hitherto utilized mechanical auxiliary means for positioning and mounting the auto glass pane in all three dimensions, make the procedure for inserting the glass pane complicated and time consuming.

The present invention is based on the task of creating an auto glass pane and a process for the insertion of an auto glass pane into the window opening of a motor vehicle body, which reduces the required materials and tools as well as the effort and time needed to complete installation.

SUMMARY OF THE INVENTION

In accordance with the present invention, this problem is solved in that the mechanical auxiliary means consist of mounting strips which, in the marginal area of the glass pane covered over by the window frame's mounting flange and, at a defined distance from the edge of the glass pane, are connected to the side of the glass pane lying opposite the mounting flange, whereby these mounting strips consist of flexible material and, after the positioning of the glass pane, can be bent around the mounting flange of the window frame.

The auto glass pane designed according to the invention, is provided with the mounting strips in the glass pane manufacturing plant in order to reduce the steps required in the auto assembly plant. During the insertion of the glass pane, no additional auxiliary means are necessary for positioning and applying pressure to the glass pane, since the required pressing forces can be applied by means of the bent mounting strips.

By means of the mounting strips, not only can the position of the glass pane in the two planar dimensions be fixed, but also the position of the glass pane in the third direction, that is to say, the direction extending perpendicularly to the pane surface can also be fixed. For this purpose, especially suited mounting strips can be used having a middle section bent at right angles between the mounting base and the bendable marginal section, whereby the section bent at right angles comes to rest against the mounting flange of the window frame and fixes the distance between the glass pane and the mounting flange.

The material from which it is made and the dimensions of the mounting strip are to be selected in such a manner so that, on the one hand, the bending of the strips around the mounting flange can be done without the aid of tools, that is to say, merely by hand.

On the other hand, the mounting strips must have sufficient bending resistance in order to support the forces necessary for holding the glass pane securely in place without bending backwards. In order to achieve the necessary balance between bending and resistance properties, the mounting strip can be provided with perforations, notches, etc.

The mounting strips, affixed in accordance with the invention to the glass pane surface have a base section by means of which they are connected to the glass surface and, in particular, are cemented to the glass surface with the aid of a suitable adhesive. The strips run parallel to the pane surface and point in the direction of the center of the pane. A series of such mounting strips are arranged on the glass pane along the periphery of the pane. The number of mounting strips is selected in such a manner so that a secure affixation of the glass pane is achieved.

Auto glass panes intended for direct installment into the window frame are customarily manufactured with a non-transparent frame-like coating, which prevents exposure of the adhesive strip to the exterior. In a similar manner, the base sections of the mounting strips are cemented to the glass pane in the area of this frame-like coating, so that the mounting strips are likewise not exposed to the outside.

A particularly expedient form of the invention comprises an auto glass pane which, in addition to the mounting strips, is also provided with a profiled adhesive molding consisting of an extruded and hardened adhesive strip. This hardened adhesive strip covers the base section of the mounting strips.

In this embodiment, a suitably thin adhesive strip is applied onto the profiled adhesive molding prior to installation of the glass pane into the window frame. This leads to increased stability of the mounting of the glass pane in the window frame during the hardening phase of the adhesive strip and, moreover, leads to a shortening of the hardening time.

Different exemplified embodiments of the invention will be described individually in the following while making reference to the drawings.

BRIEF DESCRIPTION OF THE DRAWINGS

FIG. 2 shows a bi-partite mounting strip in perspective view;

FIG. 3 shows a sectional view of the mounting strip in holding position taken along the line III—III in FIG. 2;

FIG. 4 shows another embodiment of a bi-partite mounting strip;

FIG. 5 shows the mounting strip of FIG. 4 in three different phases of installation;

FIG. 6 shows a preferred embodiment of an auto glass pane designed according to the invention, with a mounting strip which is integrated with an adhesive strip arranged on the glass pane; and FIG. 7 shows a vertical section through a windshield pane according to the invention and inserted into a window frame.

DETAILED DESCRIPTION OF PREFERRED EMBODIMENTS

Figure 1:
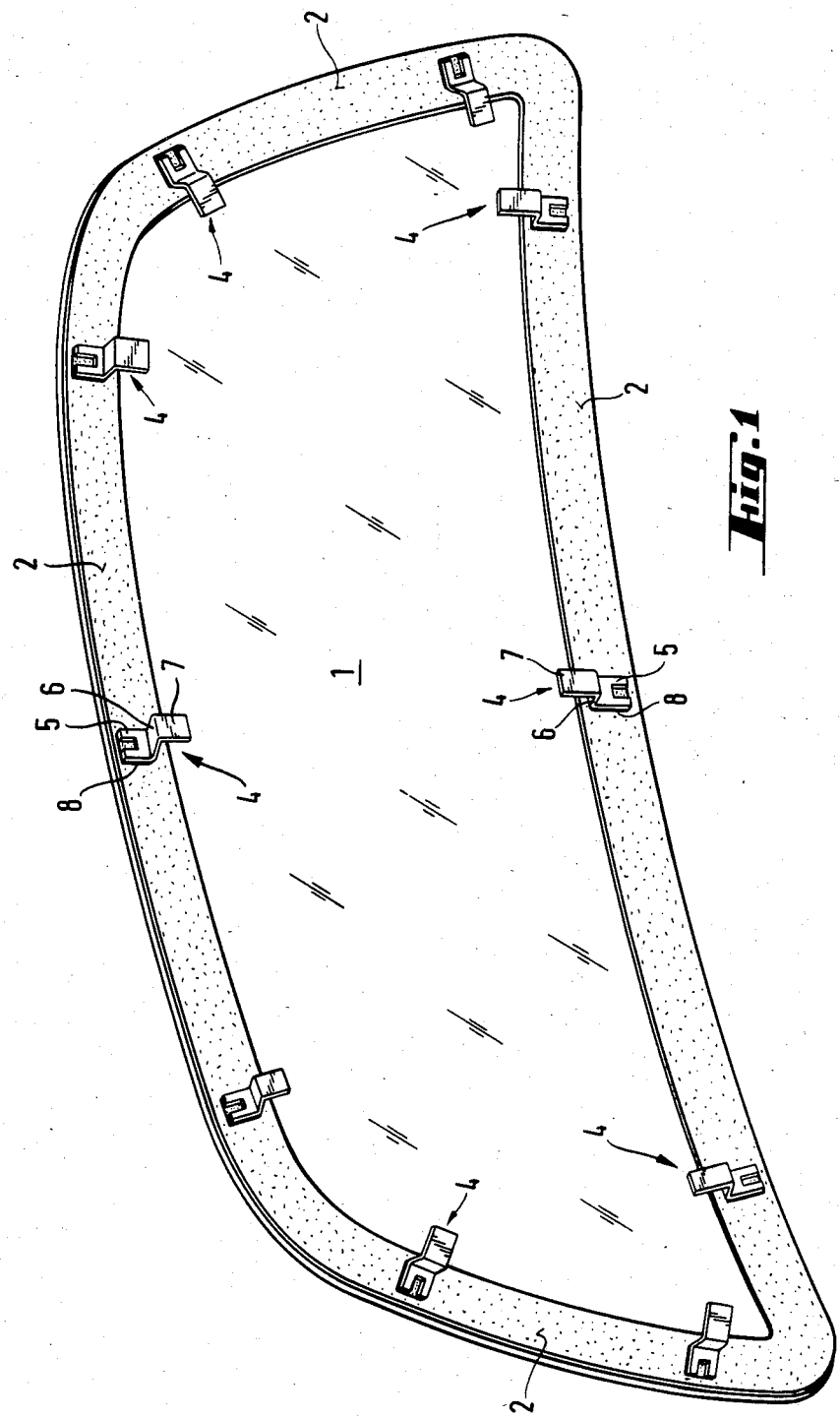
FIG. 1 shows the windshield pane with bent mounting strips in a general view.

The auto glass pane 1 illustrated in FIG. 1, represents a windshield pane for an automobile (not shown). In its marginal area, along its periphery on the side directed toward the passenger compartment, the windshield pane 1 is provided with a frame-like non-transparent layer 2. This frame-like layer 2 can be, for example, an enamel layer which has been fused-on or baked-in at high temperatures. After cutting the glass pane to size, this enamel layer can be imprinted onto the pane, for example, by a screen-printing method, and can be baked-in or fused-on in the course of the heating process required for the curving of the glass pane. In place of this, the frame-like layer 2 can also consist of another material, for example a synthetic resin lacquer or a suitable polymer which is resistant to UV-rays and is impervious to light. On this light-impervious layer 2, distributed over the periphery of the glass pane, a series of mounting strips 4 are arranged. The mounting strips 4 have a base section 5, a middle section 6 bent at 90 degrees with respect to base section 5, and a band-shaped terminal section 7, which is again bent by about 90 degrees with respect to this middle section 6, and points in the direction of the center of the pane. The base section 5 is rigidly affixed to the frame-like layer 2 and thereby to the surface of the glass pane 1 by means of a suitable adhesive layer 8. The mounting strips 4 are made from a flexible metal. The dimensions of the mounting strips 4 are selected in such a manner that the terminal sections 7 can be bent by hand, on the one hand, and on the other hand, are sufficiently resistant to bending when pressed to withstand the glass pane's own weight and the restoring forces which arise from elastic deformations of the glass pane. In given cases, the desired mechanical characteristics of mounting strips 4 can also be achieved by providing them with notches, perforations, etc.

The length of the middle section 6 of the mounting strip 4 is selected in such a manner that it corresponds to the desired distance between the surface of the glass pane and the mounting flange (34 of FIG. 7) of the window frame. The glass pane is then pressed with such force against the mounting flange during installation into the window frame, that the bent middle section 6 of the mounting strips comes in contact with the mounting flange.

The affixation of the mounting strips 4 to the auto glass pane 1 takes place during manufacture of the glass pane, that is to say in the manufacturing plant of the auto glass pane, so that the auto glass panes are provided to an auto plant with these mounting strips 4 already attached. In order to reduce the possibility that the glass surface will be damaged through contact with the terminal sections 7, the mounting strips 4 as a whole, or at least the terminal sections 7, are coated with a soft elastic layer.

FIGS. 2 and 3 show a windshield pane 1 with bipartite or two-part mounting strips, which can be used in place of the one-part mounting strips 4. Such two-part mounting strips are desirable because the terminal sections of such strips are not a hindrance during transportation of the glass pane and, moreover, the danger of damage to the glass surface is removed.

The two-part mounting strip illustrated here comprises a yoke 10, which is to be mounted onto the glass pane, and an insertion strip 13. The base sections 11 of yoke 10 are cemented onto the glass surface and insertion strip 13 is inserted into yoke 10.

The mounting of the yoke 10 onto the glass pane is accomplished during manufacture of the glass pane 1, here again with the aid of an adhesive layer 8.

Shortly before installation of the glass pane into the motor vehicle body, the insertion strip 13 having mounting section 14 is inserted into the insertion-slit formed by the glass surface and the yoke 10.

Desirably, mounting section 14 is formed so that the insertion strip 13 is tightly retained by the yoke 10. For example, mounting section 14 may be formed with snap-lock connection 17. In its length, the middle section 15, which is bent by 90 degrees, again corresponds to the desired distance between the glass pane and the mounting flange of the window frame. In regard to its mechanical characteristics, the terminal section 16 of the insertion strip 13 has the characteristics mentioned in connection with the previously exemplified embodiment.

Between the middle section 15 and the terminal section 16, a perforation 18 is provided along the edge which is bent at a sharp angle. This perforation 18 forms a predetermined breaking site, along which the terminal section 16 can be broken off after the final hardening of the adhesive strip, if one so desires.

Another embodiment of a two-part mounting strip is illustrated in FIGS. 4 and 5. This two-part mounting strip is designed in such a manner that a form-locked connection is established between the yoke 20 and the insertion strip 21. In this manner, the forces which are produced by the glass pane's own weight can be absorbed by two-part mounting strips without any danger that the two parts may become disconnected under the effect of these forces. Hence, this embodiment of the mounting strips is especially suited for the mounting strips which are affixed to the lower edge of the glass pane, where the forces produced by the glass pane's own weight act along the insertion direction.

The yoke 20 is tightly affixed to the glass pane 1 or to the non-transparent layer 2 arranged on the latter by means of a dual base section 22 and the adhesive layer 8. The form-locked connection between the insertion strip 21 and the yoke 20 is achieved by means of the two lugs 24 which engage below the yoke 20. In order to make possible the insertion of the strip 21 into the insertion slit formed by the yoke 20, the strip 21 is provided with a notch 26 in its lower insertion section 23. As it is shown in three consecutive phases in FIG. 5, the insertion strip 21 is introduced into the insertion slit in a laterally inclined position. When the lugs 24 are located below the yoke 20, the strip 21 is brought in perpendicular position with respect to the yoke 20, in which position, the lugs 24 engage below the yoke 20.

An especially preferred form of an auto glass pane designed according to the invention, is illustrated in FIG. 6. Onto the non-transparent layer 2 which adheres to the glass pane 1, a series of mounting strips 4 are mounted with the aid of an adhesive layer 8. The mounting strips 4 are covered by a profiled strip 28 which is likewise arranged on the non-transparent layer 2. This profiled strip 28 is preferably formed in the manufacturing plant of the glass panes through extrusion by means of a correspondingly formed extrusion nozzle, whereby the profiled strip 28 is deposited along the marginal area of the glass pane directly after the extrusion process, if necessary after a preceding cleaning and priming treatment. Due to this projecting crosspieces 29, the profiled strip 28 has a channel-like cross-section. After profiled strip 28 has become hardened, the channel formed by the cross-piece 29 is provided with an additional strip of adhesive material immediately prior to installation of the glass panel in the window frame. This additional strip of adhesive material aids in affixing the glass panel 1 to the window frame.

In this manner, the mounting flanges 4 are integrated into profiled strip 28. If desired, the mounting flanges 4 and the profiled strip 28 can be affixed to the glass pane in one and the same procedural step, if, to give an example, in the case of the continuous depositing of the profiled strip 28, the mounting flanges 4 are positioned at the sites provided for this purpose, directly before the application of the extruded strip. A glass pane preliminarily equipped in this manner with the mounting flanges 4 and the hardened profile strip 28 significantly simplifies the procedure for installing the glass pane onto the motor vehicle body.

By means of a vertical cross-section through a windshield pane 1 positioned within a window opening, FIG. 7 illustrates the manner for installing the glass pane. The windshield pane 1 is similar to the one illustrated in FIG. 1 and, along its periphery, has a series of doubly bent mounting strips 4, the base sections 5 of which are tightly cemented with the aid of an adhesive layer 8 to the frame-like layer 2. Along the border of the windshield pane 1, an adhesive strip 32 consisting of an adhesive known in the trade, is applied by means of an extrusion nozzle onto the frame-like layer 2. This adhesive strip 32 at the same time covers the base section 5 of the mounting strips 4.

The windshield pane 1 is then inserted into the window opening and is positioned in such a manner that the width B of the gap between the boundary surfaces 35 of the window frame and the peripheral surfaces 36 of the windshield pane 1 is uniform all the way around, that is to say, that the windshield pane 1 is arranged concentrically within the window frame. At this time, the mounting strips 4 still have their original shape. When the concentric position is attained, the glass pane 1 is pressed against the mounting flange 34 which extends all the way around the window frame, this being done in such a manner and to such an extent that the mounting strips 4 touch the mounting flange 34 with their middle sections 6. In this position, the windshield pane 1 takes on its optimum position, in which the frontal pane surface comes to lie flush against the adjacent body portions of the window frame.

As soon as the windshield pane is positioned in this manner in all three spatial dimensions, whereby in given cases it experiences also a flexible bending in the course of this procedure, the mounting strips 4 are bent by hand one after the other around the mounting flange 34. The terminal sections 16 which are bent around the mounting flange 34 come to lie thereby on the frontal surfaces of the mounting flange 34. In this way, the mounting strips 4 which are arranged along the lower border of the pane, prevent a sinking of the glass pane 1 under the effect of its own weight. At the same time, they also fix the distance of the glass pane from the mounting flange 34. Thus, the glass pane is sufficiently locked in position until the hardening of the adhesive strip 32 is completed.

I claim:

1. A glass pane for installing directly onto a mounting flange of a window frame by means of an adhesive material, comprising
    a glass body, said glass body having an inner surface, an outer surface, and an outer periphery adapted to conform to the shape of said window frame,
    a frame-like non-transparent layer located on said inner surface and in the region of said outer periphery, said layer substantially conforming to the contour of said outer periphery, and
    mounting strips mounted at intervals on the interior surface of said glass body, said mounting strips comprising base sections, substantially planar middle sections, and substantially planar terminal sections, said base sections being affixed to said frame-like layer, said terminal sections being adapted to be received by said mounting flange to fix the position of said auto glass pane within said window frame, said mounting strips being made from a plastically deformable metal whereby said metallic terminal sections can be bent about said mounting flange to retain said auto glass pane in said fixed position until said adhesive hardens.

2. The glass pane of claim 1 further comprising a profiled strip on the interior surface of said glass body affixed to said frame-like layer, said mounting strips also being mounted to said profiled strip.

3. The glass pane of claim 1 wherein said mounting strips are provided with predetermined break sites in the region between said middle sections and said terminal sections, whereby said terminal sections can be broken off after said adhesive hardens.

4. The glass pane of claim 1 wherein said mounting strips are coated with a soft elastic material to protect said glass body.

5. The glass pane of claim 1 wherein said middle sections of said mounting strips fix the distance between said glass body and said mounting flange.

6. The glass pane of claim 1 wherein said mounting strips are of unitary construction and said base sections are affixed to said frame-like layer.

7. The glass pane of claim 1 wherein said mounting strips further comprise yokes affixed to said frame-like layer, said yokes being adapted to receive said base sections of said mounting strips.

8. The glass pane of claim 7 wherein said yokes and said base sections are adapted to be form-locked together.

9. The glass pane of claim 8 wherein said base sections include lug-like projections adapted to engage with said yokes.

10. A method for directly installing a glass pane onto a mounting flange of a window frame, said glass pane comprising a glass body, said glass body having an inner surface, an outer surface, and an outer periphery adapted to conform to the shape of said window frame, a frame-like non-transparent layer located on said inner surface and in the region of said outer periphery, said layer substantially conforming to the contour of said outer periphery, and mounting strips mounted at intervals on the interior surface of said glass body along said frame-like layer, said mounting strips being made from a plastically deformable metal, said mounting strips including planar portions, said method comprising applying an adhesive material to said frame-like layer, positioning said glass body within said window frame by means of said mounting strips, said adhesive material being brought into contact with said window frame, and bending a planar portion of said mounting strips about said mounting flange to fix the position of said glass pane in said window frame until said adhesive hardens.

* * * * *